United States Patent [19]
Glass

[11] 3,811,380
[45] May 21, 1974

[54] ROCKET AND PROPELLANT THEREFOR

[76] Inventor: John P. Glass, c/o Cava Industries, 79 La Grange Ave., Essington, Pa.

[22] Filed: Jan. 23, 1968

[21] Appl. No.: 720,429

Related U.S. Application Data

[63] Continuation-in-part of Ser. Nos. 712,260, Jan. 30, 1958, abandoned, and Ser. No. 300,479, Aug. 7, 1963, abandoned, and Ser. No. 508,640, Oct. 23, 1965, abandoned.

[52] U.S. Cl.............. 102/49.7, 102/101, 102/102, 60/254, 60/256
[51] Int. Cl............................................ F42b 15/00
[58] Field of Search............................ 102/99–103, 102/34, 34.5, 40, 49.3, 49.7; 60/253–256

[56] References Cited
UNITED STATES PATENTS

| | | | |
|---|---|---|---|
| 826,293 | 7/1906 | Unge | 102/100 UX |
| 2,072,671 | 3/1937 | Foulke | 102/40 |
| 2,114,214 | 4/1938 | Damblanc | 102/100 UX |
| 2,600,678 | 6/1952 | O'Neill, Jr. | 102/103 |
| 2,856,851 | 10/1958 | Thomas | 102/49.7 |
| 2,986,092 | 5/1961 | Murphy, Jr. | 102/100 |
| 3,090,196 | 5/1963 | Brewer | 102/102 |
| 3,129,561 | 4/1964 | Priapi | 102/101 |

FOREIGN PATENTS OR APPLICATIONS

| | | | |
|---|---|---|---|
| 505,747 | 5/1939 | Great Britain | 102/49.3 |

Primary Examiner—Verlin R. Pendegrass
Attorney, Agent, or Firm—John F. A. Earley

[57] ABSTRACT

A rocket and propellant therefor comprising a body portion formed of a plurality of rings arranged in abutting relationship to form an enclosing wall having a nose and a tail end, a rocket motor positioned within the wall and including a solid propellant arranged in layers with each layer connected to one of the rings, a series of foraminous screens embedded in the propellant and presenting a concave surface to the tail end of the rocket and focusing the propellant gases on the tail end which is adapted to have a burning surface that travels toward the nose end when the rocket is in flight, said screens also controlling the shape of the burning surface by spreading it laterally. The rocket also includes means for controlling the distance of travel by extinguishing the burning surface, means for re-igniting the extinguished rocket including an electrical circuit having wires which connect with a slow-burning fuse layer, and steering means which includes an auxiliary propellant that is discharged through clusters of pipes to change the mass or energy at one side of the rocket tail to swing the tail around and change the direction of rocket travel.

15 Claims, 14 Drawing Figures

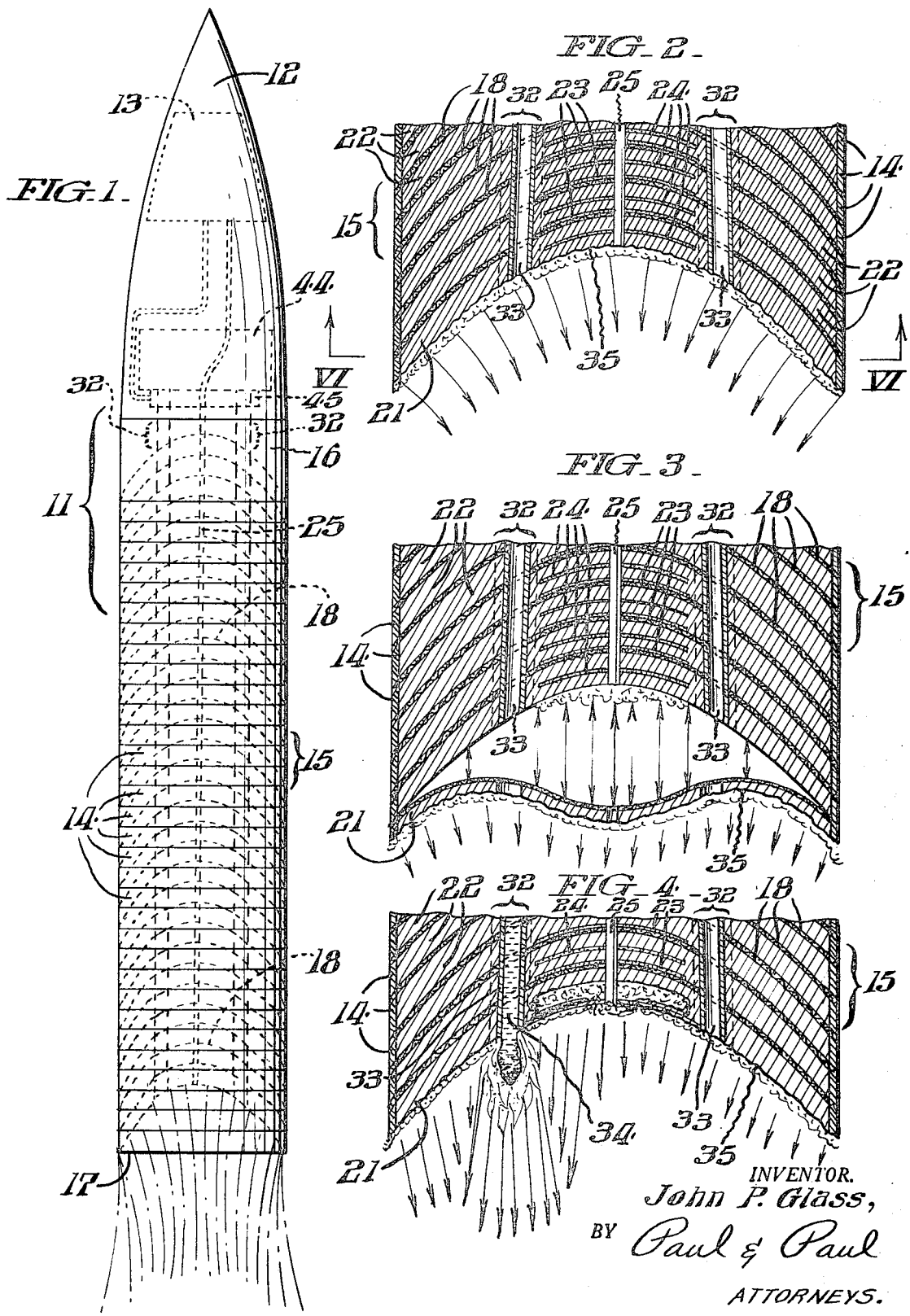

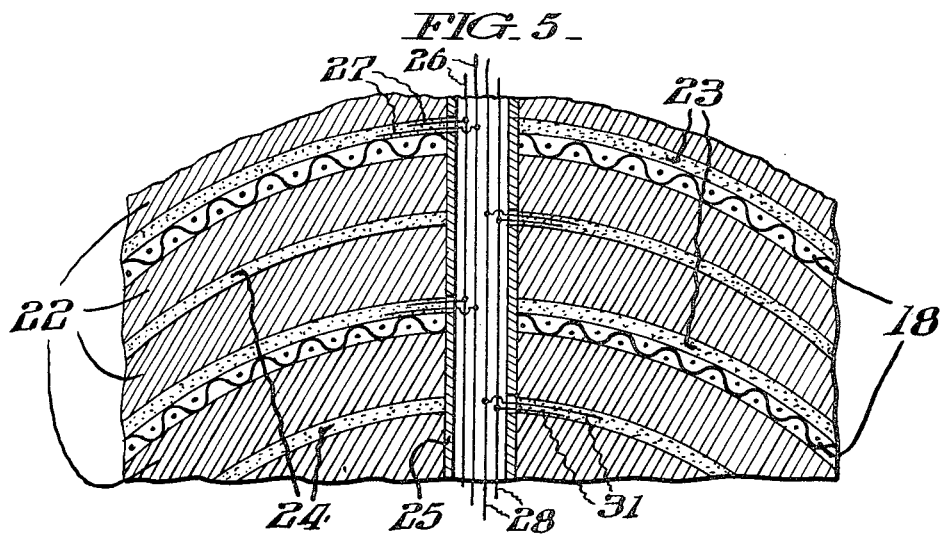
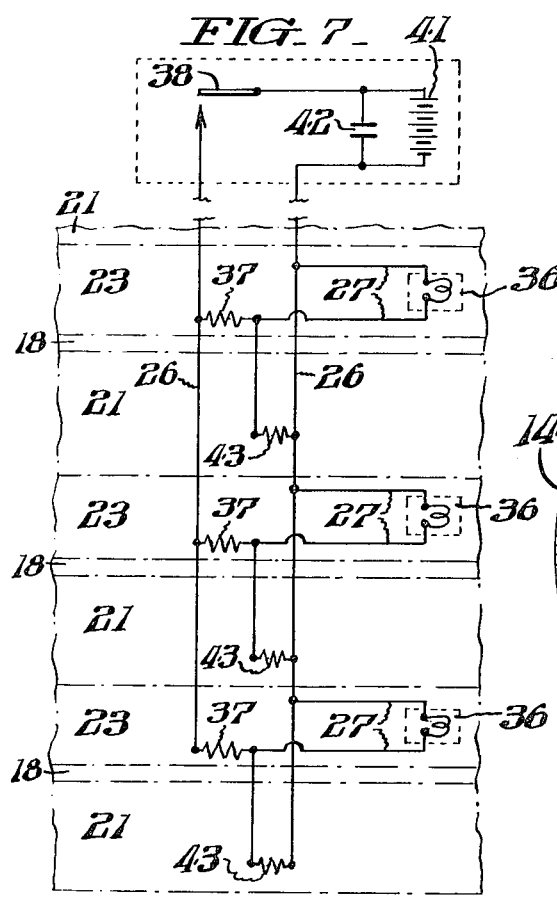
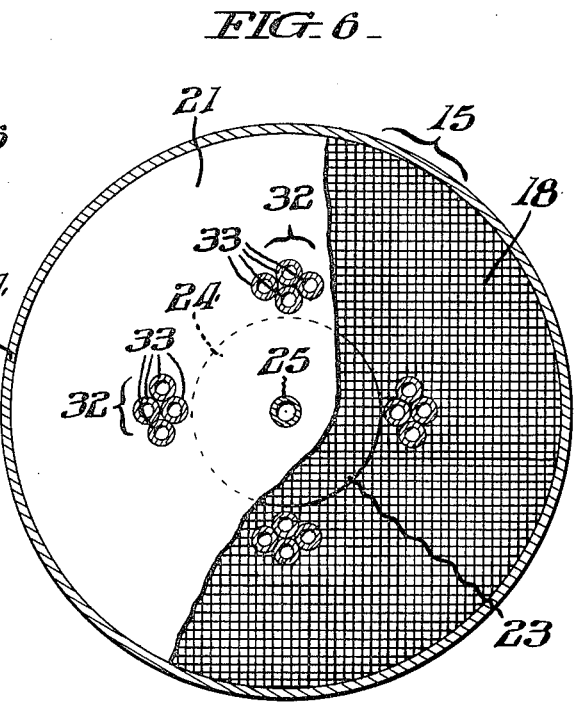

INVENTOR.
John P. Glass,
BY Paul & Paul
ATTORNEYS.

3,811,380

ROCKET AND PROPELLANT THEREFOR

CROSS REFERENCES TO RELATED APPLICATIONS

This patent application is a continuation-in-part of my co-pending patent applications Ser. No. 712,260, filed Jan. 30, 1958; Ser. No. 300,479, filed Aug. 7, 1963; and Ser. No. 508,640, filed Oct. 23, 1965 all now abandoned.

BACKGROUND OF THE INVENTION

This invention relates to rockets and to solid fuels therefor.

At the time this invention was made, Russia had orbited its first Sputnik, and the United States had yet to orbit any of its satellites.

SUMMARY OF THE INVENTION

This invention relates to a rocket, and more particularly concerns a rocket of improved construction, and an improved means of propelling the rocket, controlling the distance of rocket travel, and steering the rocket.

It is an object of this invention to provide an improved rocket.

It is another object to provide a rocket in which the propellant burns evenly as its burning surface progresses along the longitudinal axis of the rocket from the tail end to the nose end.

It is another object of this invention to provide a rocket with a system that effectively and simply controls the distance which the rocket travels.

It is another object to provide a rocket with a system for steering it that is simple and easy to operate.

It is another object to provide a rocket which is so constructed that all of its structural members may, if desired, serve also as fuel to propel the rocket.

It is another object to provide a rocket which rises out of the atmosphere of the earth at moderate acceleration and velocity.

It is another object of this invention to provide a rocket which is light in weight and which requires little structural strength.

It is another object of this invention to provide a rocket with a propellant that burns efficiently.

It is another object to provide a rocket with a propellant which has a slower overall burning rate than the high burning rate of individual elements thereof.

BRIEF DESCRIPTION OF THE DRAWINGS

Other objects and advantages of this invention including the simplicity and economy of the same, will further become apparent hereinafter and in the drawings, in which:

FIG. 1 is a view in side elevation of a rocket constructed in accordance with this invention;

FIG. 2 is a view in central longitudinal section of the tail end of the rocket as the burning surface of its propellant progresses toward the nose end of the rocket;

FIG. 3 is a view similar to FIG. 2 and shows the rocket as it blows off and extinguishes the burning surface of its propellant;

FIG. 4 is a view similar to FIG. 2 and shows the rocket being re-ignited; FIG. 4 also shows the burning of an auxiliary propellant emerging from a steering tube;

FIG. 5 is a fragmentary view in central longitudinal section on an enlarged scale and shows more clearly the distance control system;

FIG. 6 represents a broken view in cross section parallel to the burning surface of the propellant taken as indicated by the lines and arrows VI—VI which appear in FIG. 2;

FIG. 7 represents a diagrammatic view of the distance control system of the rocket;

DESCRIPTION OF THE PREFERRED EMBODIMENTS

Figure 8:
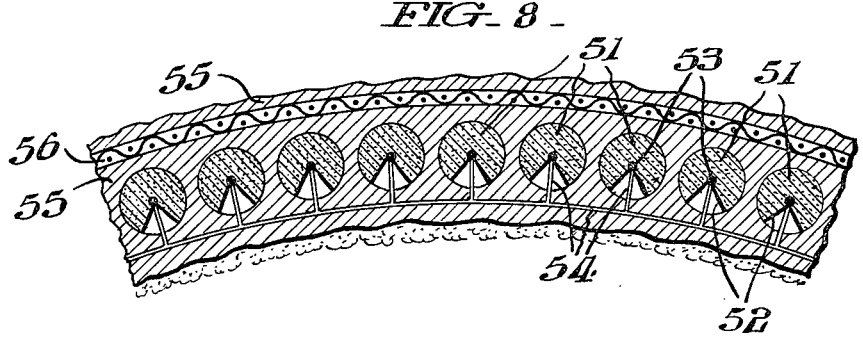
FIG. 8 is a fragmentary view in central longitudinal section on an enlarged scale and shows one embodiment of the propellant arrangement.

Although specific terms are used in the following description for clarity, these terms are intended to refer only to the structure shown in the drawings, and are not intended to define or limit the scope of the invention.

Turning now to the specific embodiment of the invention selected for illustration in the drawings, the number 11 designates generally a rocket having a nose portion 12 containing controls 13, and a body portion having a plurality of rings 14 which are arranged in abutting relationship to form a wall 15 having a nose end 16 and a tail end 17.

Extending transversely across the interior of each ring 14 is a screen 18 which presents a concave surface to tail end 17. Contained within the wall 15 is a solid propellant 21 which has imbedded therein the screens 18 so that curved segments or layers 22 of propellant 21 are formed between the screens 18.

Positioned adjacent the convex surface of each screen 18 is a layer 23 of explosive material, which may be the common military explosive R D X or the like, and positioned intermediate the screens 18 and within the layers 22 are layers 24 of re-igniting material.

Extending longitudinally through the rocket is a distance control tube 25 which aids in controlling the distance of rocket travel, and which is centrally positioned and shown most clearly in FIG. 5. Wires 26 extend through tube 25 and have a series of wires 27 extending therefrom into explosive layers 23. Also positioned in tube 25 are wires 28 having a series of wires 31 extending therefrom into re-igniting layers 24.

Also extending longitudinally through the rocket are clusters 32 of steering system pipes 33. Pipes 33 are adapted to selectively extrude an auxiliary propellant 34 through the steering system pipes 33 to burn at the burning surface 35 of the main propellant 21 (FIG. 4) in order to steer the rocket.

As is shown in FIG. 7, wires 26 and 27 are part of an electrical circuit which controls the distance of rocket travel. The electrical circuit includes a detonator 36 which is imbedded in each explosive layer 23. Each detonator 36 is in series with a resistance 37 and with a switch 38 which may be a relay or any other means for closing an electrical circuit. Also provided is a battery 41 which has capacitor 42 across it which is so arranged that capacitor 42 discharges upon closing switch 38. Each detonator 36 is provided with a shunt 43 which, when in the circuit, by-passes the current in the closed circuit so that the detonator 36 with which the shunt is associated does not detonate. However, shunts 43 are positioned within the solid propellant layer 22 which is on the other or tail end side of the screen from its associated detonator 36. The advance of burning surface 35 burns away each shunt 43 in succession, so that when a detonator 36 has had its associated shunt 43 burned away, the closing of switch 38 acts to detonate the explosive layer 23 in which the now shuntless detonator 36 is located.

As is shown in FIG. 1, the nose portion 12 of the rocket contains a tank 44 which contains the auxiliary propellant 34. A valve 45 is provided for controlling the admission of auxiliary propellant 34 into the steering system pipes 33.

FIG. 8 shows one embodiment of the propellant arrangement wherein the numeral 51 designates a plurality of shaped charges. Charges 51 are here shown as being spherical in shape with a cone-shaped opening 52 leading to a detonator 53. Detonators 53 are tied together by a fuse 54, and the charges 51 are imbedded in a matrix 55 of slower burning material. Also shown in a screen 56 which connects to a ring (not shown), as in previously described embodiments.

Figure 9:
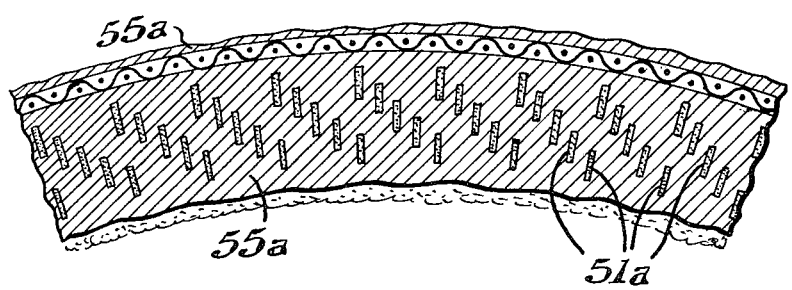
FIG. 9–14 are views similar to FIG. 8 and show other embodiments of the propellant arrangement.

In the embodiment shown in FIG. 9, charges 51a are elongated in shape and are granular in form, somewhat like a cigarette or a minature rocket. Charges 51a may be capsules, grains, or crystals, and may have any desired cross section. Charges 51a are randomly dispersed in matrix 55a but have their longitudinal axes oriented so that when fired the gas is liberated toward the tail end of the rocket to propel the rocket in its forward direction.

The charges 51 and 51a are made of an explosive such as ammonium nitrate in a rubber or resin binder.

In operation, the charges 51, 51a are detonated to, in effect, kick against their own inertia and emit an extremely high velocity flame which is directed toward the tail end of the rocket by the shape of the charges 51, 51a. This provides a propelling force which propels the rocket in the desired noseward direction, and to do this the charges 51, 51a are so constructed that they do not explode in a sideways or forward direction. In the time intervals between the explosions of the charges 51, 51a, the burning surface of the rocket progresses at a slower rate through the matrix 55, 55a. This arrangement slows down the overall burning rate of the rocket propellant, but does not affect the burning rate of the individual charge elements of the propellant. This arrangement causes the rocket to rise out of the atmosphere of the earth at moderate acceleration and velocity, and reduces the strength required of the rocket structural elements, thereby lessening the dead weight of the rocket. Excessive rocket velocity while in the earth's atmosphere has been a disadvantage of previous rockets in that the rocket overheats and makes wasteful use of the energy available, and excessive rocket velocity creates excessive stresses in the rocket structure. With the fused charges 51 of FIG. 8, the rocket may be steered if desired by selectively setting off the charges 51.

It has been a problem to use properly the rocket propellants that are presently available. The problem has involved burning the propellant at its most efficient rate whereby as much as possible of its energy is used to propel the rocket. If the propellant is burned too fast, it explodes; and if it is burned too slowly, it is being used inefficiently. An object of this invention is to burn the propellant so that it expels its gas at the optimum rate, as fast as it is created, no faster and no slower. If the combustion rate of the propellant is too fast the gas omitted cannot be liberated fast enough and the propellant explodes. Accordingly, the desired burning rate from the standpoint of efficient use of the propellant is close to but lower than the critical burning rate at which the propellant explodes. But this burning rate gives more thrust to the rocket than is needed; gives more acceleration and velocity to the rocket than is needed; burns the propellant too quickly so that none is left when it is needed later on, toward the end of the rocket travel; and creates excessive stresses in the rocket structure. The shaped charge system of the propellant arrangement provides for control of the overall burning rate of the rocket propellant while burning the explosive in the shaped charges at its faster and more efficient rate.

Figure 10:
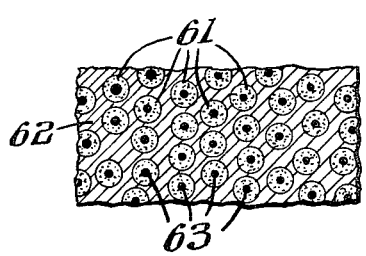

FIG. 10 shows another propellant arrangement wherein the numeral 61 designates a plurality of pellets of explosive imbedded in a matrix 62. Each pellet 61 has in its center a nucleus 63 which detonates in response to the heat of the advancing burning surface. When a sufficient intensity of heat reaches a nucleus 63, the nucleus detonates and the pellet 61 explodes toward the advancing burning surface since that direction is along the line of least resistance. Accordingly, the rocket is propelled in a forward direction. Pellets 61 may be on the order of one sixty-fourth of an inch in diameter, whereas shaped charges 51 may be on the order of one-half inch in diameter.

Figure 11:
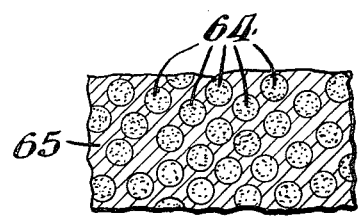

FIG. 11 shows another propellant arrangement wherein the numeral 64 designates a plurality of pellets suspended in a matrix 65. Pellets 64 may be crystalline in form. The arrangement shown in FIG. 11 is the preferred propellant arrangement, in which pellets 64 are designed to burn rather than detonate. The burning rate of the individual pellets 64 is very much higher than the overall average burning rate of the propellant as the burning surface advances from the tail to the nose end of the rocket. Accordingly, pellets 64 are burned at an optimum rate for propulsion efficiency, and the burning surface of the rocket is advanced at an optimum rate for propulsion efficiency, and the burning surface of the rocket is advanced at an optimum rate for controlled acceleration and velocity. The rocket acceleration is greatly reduced over what the rate would be if the overall propellant were burned at the rate of the individual pellets 64. The operation of the burning of the propellant might almost be described as a controlled intermittent firing of individual pellets of explosive, each firing of an individual pellet being quite violent but not of the magnitude of a detonation. The firing of individual pellets does not spread through the propellant as a whole to detonate other grains. This would be undesirable, since then the burning surface would not advance at an even rate and an explosion might result. Ammonium nitrate is a preferred explosive in the embodiment of FIGS. 10 and 11. The ammonium nitrate of pellets 61 is formed with a binder such as rubber or a thermoplastic containing hydrogen.

In operation, the rocket 11 is propelled by burning the accessible surface of the propellant 21. This burning surface 35 liberates propellant 21 as a gas. The liberated gas is focused by having had burning surface 35 concave in shape. The burning of propellant 21 is controlled so that it burns evenly along the longitudinal axis of the rocket through the use of transverse screens 18 which stabilize the burning surface by retarding hot spots. Accordingly, burning surface 35 advances at an even rate. As burning surface 35 progresses along the rocket, it passes each screen 18 in succession. Upon passing each screen 18, the screen is discarded and expelled from the rocket together with its associated ring 14.

In another embodiment of this invention, screen 18 is made of a combustible material such as magnesium or aluminum alloys which, together with an oxidizing agent, operates so that the screen itself burns. Here, the energy generated by burning the screen is added to the propelling force of the rocket. In still another embodiment of the invention, rings 14 are similarly constructed of a combustible material and the energy of burning the rings 14 is also added to the propelling force of the rocket.

It is to be noted that burning surface 35 has a concave surface which may be a moderately curved hyperbola or parabola. The gas leaves burning surface 35 with as much energy as it will ever have, and it leaves in a direction which is perpendicular to the burning surface. The gas leaving the burning surface is directed or focused as desired by changing the shape of the burning surface, which may be accomplished by changing the shape of the screens 18 and the initial shape of the propellant at its tail end.

The screens 18 separate the solid propellant into sections or segments and stabilize the burning of the propellant by retaining or retarding hot spots. Additionally, the screens 18 within propellant 21 hold rocket 11 together, and screens 18 transfer internal stresses of the rocket to the rings 14 which form rocket wall 15.

On penetrating a screen, the flame of burning surface 35 is spread laterally by the screen. This lateral spreading of the flame takes place very quickly, and burning surface 35 having been established on the nose end side of screen 18, the flame discards screen 18 and its associated ring 14 by forcing them out and away from the rocket.

The screens 18, therefore, maintain the burning surface 35 in the shape desired, act as a structural member to transmit pressures of the burning surface 35 from the interior of the rocket to the edge (i.e., to the nested metal rings 14 which form the rocket wall 15), and add to the propulsive mass of the rocket (the mass thrown out backwards from the rocket) by being ejected from the rocket. The weight of the structural mass (screens 18, rings 14) of the rocket is thereby added to the rockets thrust. Further, the rocket has been lightened in weight by the progressive discard of the structural mass.

The distance control of the rocket is operated by extinguishing burning surface 35 when the rocket has attained the desired velocity and altitude that will take it to its target. This extinguishing of burning surface 35 is accomplished by using a telemeter or other device which operates to close switch 38 (FIG. 7) to discharge capacitor 42 which energizes the firing circuit. Energizing the firing circuit detonates a layer of explosive 23 and thereby ejects from the rocket 11 a screen 18 which is on the nose end side of burning surface 35 (see FIG. 3). This distance control apparatus may be operated from the rocket or from the ground. All of the detonators 36 are provided with shunts 43 which prevent accidental or unwanted detonation. The shunt 43 from the selected explosive layer 23 is burned away by the progressive movement of burning layer 35.

If it should be desired to re-ignite a rocket, a circuit is provided having wires 28 which connect with slow burning fuse layers 24. Actuating the circuit of wires 28 ignites fuse layer 24 to re-establish a burning layer as in FIG. 4.

The use of a rubber type propellant is a preferred propellant in the rocket of this invention in order to avoid cracks in the propellant which would result in uneven burning. The tensile strength of rocket 11 as herein described depends on the propellant, but the tensile strength is increased if desired by providing straps which connect rings 14 together.

The steering of the rocket is effected by burning auxiliary propellant 34 at desired times at selected portions of burning surface 35. For this purpose, the clusters 32 of pipes 33 are provided as well as tank 44 of auxiliary propellant 34 and its valve 45. Auxiliary propellant 34 is preferably a gelatin type propellant such as nitroglycerin stablized by additives. The rate of burning of the auxiliary propellant 34 is somewhat slower than that of main propellant 21 so that the burning of auxiliary propellant 34 takes place toward the tail end side of burning surface 35 (FIG. 4). The gelatin auxiliary propellant 34 is selectively extruded from the high pressure supply tank 44. It is also preferred that the pipes 33 of clusters 32 be made of combustible material such as metals of low melting point, for instance zinc or aluminum.

In operation of the steering system, the extruded gel 34 in burning kicks the flame of burning surface 35 over to one side of the rocket, and this greater energy and mass on one side shoves the tail end of the rocket 11 around. Control valve 45 is itself controlled by gyros in a manner similar to the gyro control provided for an automatic pilot.

It is to be observed that the gel of auxiliary propellant 34 must not be a material which will detonate up the pipe, but it must be sufficiently viscous or solid so that the rocket cannot fly away from it. While gelatinized water could be used in pipes 33, such material adds only to the mass at one side of the rocket to swing the tail of the rocket, and does not add to the energy. Accordingly, it is preferred to use an active control material which swings the tail of the rocket by adding to both the mass and the energy at one side of the rocket.

Figure 12:
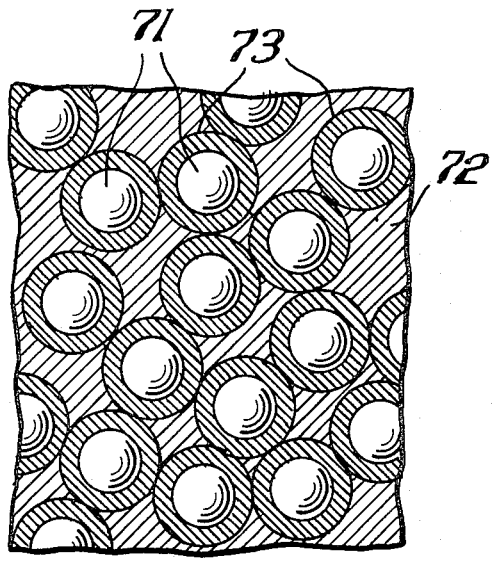

FIG. 12 shows another propellant arrangement wherein the numeral 71 designates a plurality of pellets of faster-burning material imbedded in a matrix 72 of slower-burning material. Each pellet 71 is provided with a coating 73 which controls the spacing between the pellets so that the fast-burning materials of adjacent pellets are not in contact with each other. If pellets 71 were in contact, the flame from one pellet would be transferred too quickly to the next pellet, the rocket would burn too fast and might explode. Coating 73 prevents premature transfer of flame from pellet to pellet.

Pellets 71 are encapsulated with coating 73 prior to the time when the pellets are imbedded in matrix 72. Coating 73 is preferably a tough resilient film which is shock resistant, stable, and burns off cleanly. The resiliency of coating 73 protects the pellets 71 against being detonated by pressure waves, and the same rubber material used for matrix 72 may be used for coating 73 for this purpose, if desired.

Pellets 71 are preferably of uniform spherical shape so that the advancing concave burning surface contacts them at the correct spot to expel their burning gases in a focused manner.

Figure 13:
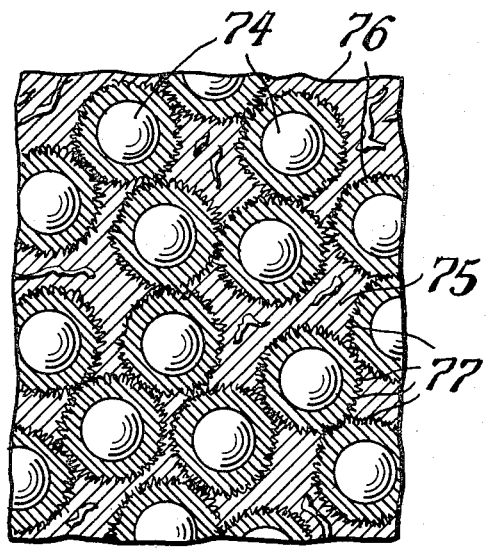

FIG. 13 illustrates another propellant arrangement wherein there is provided a plurality of pellets 74 randomly dispersed within a matrix 75. A resilient coating 76 is provided which includes fuzzy fibers 77 that add structural strength to the propellant. Fibers 77 may be made of glass or asbestos, materials which do not have any burning capacity, but which give structural strength.

Figure 14:
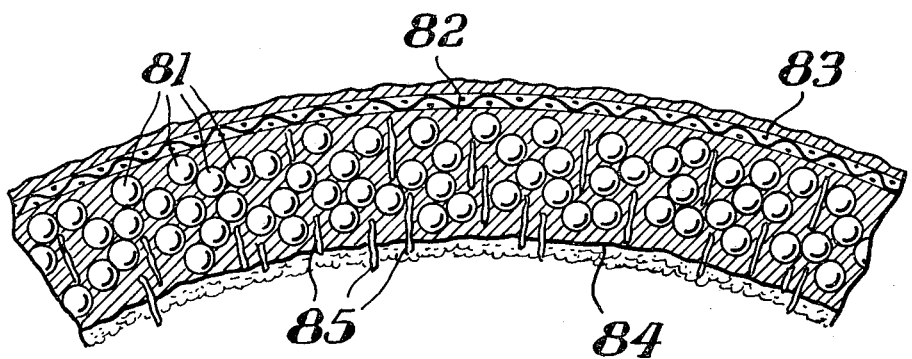

FIG. 14 illustrates another embodiment of the invention which includes pellets 81 randomly dispersed in a matrix 82. A screen 83 is imbedded in matrix 82 and a burning surface 84 is advancing towards the screen. To provide added structural strength to the propellant, fuzzy fibers 85, which may be glass fibers or asbestos fibers, are imbedded therein. Such fibers, being made of refractory material, glow but do not burn, and mechanically hold the burning surface 84 to the propellant.

The burning rate of surface 84 might be so fast that the rocket could possibly burn itself out, or expel the entire burning surface 84 from the tail end of the rocket, thus causing the rocket to lose its propelling force. To avoid this, fibers 85, being red hot but still being strong, retain sufficient heat and energy to insure a continuous firing of the burning surface as it travels to the nose end of the rocket.

A rocket using the propellant of the present invention may develop enormous pressures, and the propellant constructed in accordance with this invention would be strong enough to withstand such pressures.

Another arrangement to prevent hot spots penetrating the propellant ahead of the burning surface is to make the screens, such as screens 18, of a material which is faster burning then the propellant. When a hot spot contacts such a screen, the flame from the hot spot is spread laterally along the screen very quickly, and thus establishes a new burning surface which is of the desired controlled shape.

The rocket constructed in accordance with the present invention is lighter in weight and less expensive to manufacture than rockets of conventional construction. Because of this, it readily lends itself to use as a take-off assist, to assist aircraft in taking off from the ground or from aircraft carriers.

Propellants of the present invention are made of a material which burns rapidly and uniformly, but which does not explode easily when contacted by a pressure shock wave. Burning takes place upon transfer of heat to a material by radiant energy, not on a transfer of energy by mechanical shock waves, which causes explosions. Accordingly, it is desirable to use a material which is heat sensitive, exothermic, and is constructed of molecules which are light in weight. It may also be desirable to mix a material in the mixture to blacken it so that it readily absorbs radiant energy.

An explosive material may be used in the pellet if another material is added thereto to retard too rapid burning, or prevent detonation. This retarding material may be mechanically mixed with the explosive material. The retarding ingredient insures controlled burning, and prevents exploding.

The matrix may be a rubber material because of its well-known desirable burning qualities. However, an epoxy resin may be used if greater strength is required or desired. The epoxy resin may be cast into segments in a mold, with the pellets molded therein. The mold is kept at a cooling temperature so that the liquid epoxy resin when poured into the mold does not generate sufficient heat to fire the pellets. The molded segments may then be assembled with the screens in between them to form the propellant of the rocket.

The rings 15 may also be made of glass fibers in an epoxy resin binder, if desired.

This invention is adapted to utilize a wide variety and combination of materials, and is not limited to any specific material or materials. For example, the operativeness of the arrangement of pellets of a faster-burning material dispersed in a matrix of slower-burning material may be demonstrated in a simple manner by dispersing granules of potassium chlorate blasting powder in a matrix of biscuit dough. Propellant grains made from such a mixture do not explode, they fly through the air when ignited.

Any very rapidly detonating material may be used as the extinguishing layer. The material is preferably formed in a thin film, and transfers very little heat to the matrix on both sides.

The word "detonation" is defined herein as a sudden chemical rearrangement of molecules induced primarily by mechanically transferred energy such as by ultrasonic pressure waves. Examples of detonating materials are high explosives such as nitroglycerin, R D X, etc.

The term "fast-burning material" is used herein to define those materials which do not detonate, but in which the energy is transferred from the burning portion to the unburned portion primarily by heat. A detonating material may be converted into a fast-burning material by adding shock absorbing diluents.

The term "slow-burning material" is used herein to designate such slow burning materials as black powder, nitrocellulose with a diluent to make it burn slowly, and the like.

This invention is concerned with the differences in speed of burning of rocket propellant material. It has an object of causing fast-burning material to burn in small lots or pellets, thereby providing locally high velocities and propellant force. This fast-burning material is controlled by a matrix of slower-burning material which prevents detonation of the rocket, and which controls the driving force by controlling the timing rate at which the fast-burning pellets are set off. The overall advancing burning surface, such as surface 35, is slower than the burning rate, or the expulsion rate, of the pellets of fast-burning material.

Suitable materials for making the various elements of the propellant are well known in the art. For example, coating 73 may be made of nitrocellulose.

Various propellant materials are disclosed in U.S. pat. No. 3,026,672 which issued on Mar. 27, 1962 to George D. Sammons, the specification of which refers to solid propellant mixtures and a process for their production which are disclosed in the U.S. application Ser. No. 284,447, filed Apr. 25, 1952, by W. B. Reynolds and J. B. Pritchard, now U.S. pat. No. 3,003,861.

For example, the slow-burning matrix 21 may be a rubbery material such as a copolymer of butadiene and a vinylpyridine or other substituted heterocyclic nitrogen base compound, which after incorporation is cured by a quaternization reaction of a vulcanization reaction.

It is to be understood that the form of the invention herein shown and described is to be taken as a preferred embodiment. Various changes may be made in the shape, size and arrangement of parts. Equivalent elements may be substituted for those described herein, parts may be reversed, and certain features of the invention may be utilized independently of the use of other features, all without departing from the spirit of the invention or the scope of the subjoined claims.

I claim:

1. A rocket comprising a series of rings arranged in abutting relationship to form an enclosing wall having a nose and a tail end, a rocket motor within said wall including a solid propellant, said tail end adapted to have a burning surface which travels toward the nose end when the rocket is in flight, said propellant being arranged in layers with each layer connected to one of said rings, and a series of foraminous screens imbedded in the propellant between said layers and attached to said rings to transfer stress thereto and hold the rocket together, said screens presenting a concave surface to said tail end to focus the propellant gases and control the shape of the burning surface by spreading the burning surface laterally.

2. The rocket defined in claim 1, wherein said screens are made of a slower burning material than said propellant to thereby retard hot spots.

3. The rocket defined in claim 1, wherein said screens are made of a faster-burning material than said propellant to quickly spread laterally the flame from any hot spots.

4. The rocket defined in claim 1, wherein said screens are made of metal.

5. The rocket defined in claim 1, wherein a layer of slow-burning fuse material is positioned in the rocket propellant between the screens with electrical leads imbedded in said fuse material and extending therefrom to a re-ignition means chamber.

6. A rocket comprising an enclosing wall having a nose and a tail end, a solid rocket propellant contained within said wall and presenting a burnable surface to said tail end, a series of foraminous screens imbedded in said propellant and extending transversely across the interior of each of said rings, said screens presenting a concave surface to said tail end, and a separate re-ignition layer of slow-burning fuse material located between said screens, said rocket propellant comprising a plurality of charges of rapid burning propellant which are spherical in shape with a cone-shaped opening leading to a detonator so as to expel their burning gases in one direction when burning and are dispersed between said nose and tail end to burn successively, and a matrix of slower-burning cushioning material in which said charges are supported and oriented so that their burning gases are expelled toward said tail end, whereby the average rate of burning of said rocket propellant as a whole is intermediate the rate of burning of said charges and said matrix.

7. The combination defined in claim 6, wherein said charges are provided with fuses, and fuse wire extending from said fuses to a control system chamber.

8. A solid propellant for rockets and the like comprising a matrix of a solid burnable material, and pellets dispersed within said matrix, said pellets being made of a faster-burning material than said matrix material, said pellets being spherical in shape with a cone-shaped opening leading to a detonator, said propellant being arranged in identically shaped concave segments positioned to focus the gas toward the tail.

9. A rocket comprising a series of rings arranged in abutting relationship to form an enclosing wall having a nose and a tail end, a solid rocket propellant contained within said wall and presenting a burnable concave surface to said tail end, said solid propellant comprising a matrix of solid burnable material, and pellets dispersed within said matrix, said pellets being made of a faster-burning material than said matrix material, said pellets including a resilient coating which protects the pellets against being detonated by pressure waves, said resilient coating having fuzzy fibers that add structural strength to the propellant, and a separate layer of slow-burning fuse material located in said propellant and connected to a re-ignition means chamber.

10. A rocket comprising an enclosing wall having a tail end, a solid rocket propellant contained within said wall and presenting a burnable surface to said tail end, a series of foraminous screens imbedded in said propellant and extending transversely across the interior of each of said rings, said screens presenting a concave surface to said tail end, and a separate re-ignition layer of slow-burning fuse material located between said screens, said rocket propellant comprising a plurality of pellets of explosive embedded in a matrix, with each pellet containing a nucleus which detonates in response to heat.

11. A rocket comprising an enclosing wall having a tail end, a solid rocket propellant contained within said wall and presenting a burnable surface to said tail end, a series of foraminous screens imbedded in said propellant and extending transversely across the interior of each of said rings, said screens presenting a concave surface to said tail end, and a separate re-ignition layer of slow-burning fuse material located between said screens, said rocket propellant comprising a plurality of pellets of explosive embedded in a matrix, with each pellet having a resilient coating which includes fuzzy fibers that add structural strength to the propellant.

12. A rocket comprising an enclosing wall having a tail end, a solid rocket propellant contained within said wall and presenting a burnable surface to said tail end, a series of foraminous screens imbedded in said propellant and extending transversely across the interior of each of said rings, said screens presenting a concave surface to said tail end, and a separate re-ignition layer of slow-burning fuse material located between said screens, said rocket propellant comprising a plurality of pellets of explosive imbedded in a matrix, said matrix having fibers of refractory material imbedded therein to provide added structural strength to the propellant.

13. A solid propellant for rockets and the like comprising a matrix of solid burnable material, and pellets dispersed within said matrix, said pellets being spherical in shape with a cone-shaped opening leading to a detonator.

14. The propellant defined in claim 13, wherein said pellets are provided with fuses, and fuse wire extending from said fuses to a control system chamber.

15. A solid propellant for rockets and the like comprising a matrix of solid burnable material, and pellets dispersed within said matrix, each of said pellets containing a nucleus which detonates in response to heat.

* * * * *